United States Patent [19]

Bowdy

[11] 4,172,571
[45] Oct. 30, 1979

[54] THREE ACTUATOR STEERING SYSTEM

[75] Inventor: Fredrick E. Bowdy, Seattle, Wash.

[73] Assignee: The United States of America as represented by the Secretary of the Air Force, Washington, D.C.

[21] Appl. No.: 872,195

[22] Filed: Jan. 25, 1978

[51] Int. Cl.² .............................................. B64C 25/50
[52] U.S. Cl. ...................................... 244/50; 114/150; 180/152
[58] Field of Search ................. 244/47, 46, 50, 100 R, 244/102 R, 103 R, 103 CW; 280/92, 93, 95 R; 180/139, 152, 14 C; 74/99 R; 114/150

[56] References Cited

U.S. PATENT DOCUMENTS

| | | | |
|---|---|---|---|
| 2,650,782 | 9/1953 | Fehring | 244/50 |
| 2,841,231 | 7/1958 | Armington | 180/139 |
| 2,943,818 | 7/1960 | Camino et al. | 244/50 |
| 3,326,317 | 6/1967 | Marquardt | 180/139 |
| 3,954,232 | 5/1976 | Harper | 244/102 R |

FOREIGN PATENT DOCUMENTS 1323534  3/1963  France .................... 114/150

Primary Examiner—Galen L. Barefoot
Attorney, Agent, or Firm—Joseph E. Rusz; James S. Shannon; Casimer K. Salys

[57] ABSTRACT

A three actuator steering mechanism for rotating a strut type forward landing gear of an aircraft particularly adapted for use in ground steering. The actuators are of a linear push-pull construction and are mounted at both ends by rotatable joints. At one end the joints attach the actuators to a nonrotating segment of the landing gear structure, while at the opposite ends the joints connect the actuators to a steering collar through which the landing gear is actually rotated. With the landing gear aligned in the forward direction, the two laterally mounted actuators form moment arms with the steering collar about the vertical rotational axis of the landing gear, in the conventional fashion. The center actuator is attached with an orientation such that it contributes no steering torque with the landing gear facing forward but increasingly supplements the two lateral actuators as the steering angle of the steering collar diverges in either direction from forward. The push-pull control of all three actuators is regulated by means of crossover valves responsive to the angular alignment of the rotatable steering collar. The torque output of the steering collar is the cumulative effect of the three actuators working in concert. When appropriately oriented, not only is the available steering torque symmetric about the forward direction but increases substantially as the steering angle rises, thereby providing the additional torque necessary to offset concurrent increases in demand created by effects such as tire scuffing, aircraft weight shifts and landing gear caster angle.

4 Claims, 3 Drawing Figures

THREE ACTUATOR STEERING SYSTEM

RIGHTS OF THE GOVERNMENT

The invention described herein may be manufactured and used by or for the Government of the United States for all governmental purposes without the payment of any royalty.

BACKGROUND OF THE INVENTION

This invention relates to steering mechanisms and more particularly to a configuration adapted for use in a strut type forward landing gear of an aircraft.

The telescoping strut type landing gear to which the invention relates is of a configuration well known in the aircraft industry. Likewise, the mounting of actuators between a nonrotating structure and a steering collar attached to a rotatable wheel structure is known in the art. For example, such a configuration appears in U.S. Pat. No. 2,930,547. Another approach for creating a steering torque in a strut type landing gear is disclosed in U.S. Pat. No. 2,943,818. Here the inventors show an apparatus in the form of a steering motor consisting of a multiple cam steering collar upon which three piston actuated followers press. Though this apparatus allows rotation of the landing gear through a full 360 degrees with a constant level of output torque, no compensation is provided to offset load increases associated with increases in the steering angle. Furthermore, the instantaneous magnitude of output torque produced by this mechanization is the result of only one actuation piston with the remaining two in either a neutral or an opposing mode of operation.

The invention contained herein was devised in response to a torque inadequacy problem in the steering of the YC-14 phototype aircraft front landing gear. It was found that the existing two piston steering mechanization, similar to that shown in U.S. Pat. No. 2,930,547 lacked adequate torque when the steering approached the limits of 60 degrees either direction from forward. Attempts to improve the steering performance by varying the geometry while retaining a dual actuator system were unsuccessful, due in part to constraints imposed by the landing gear configuration and hydraulic system limitations.

BRIEF SUMMARY OF THE INVENTION

It is one object of this invention to provide a comparatively simple steering mechanism which is capable of supplying a large turning torque through a large turning angle.

It is another object of this invention to provide a comparatively simple steering mechanism which is capable of producing a rapidly rising magnitude of turning torque as the steering angle becomes significant.

Further, it is an object of this invention to provide a mechanism which performs the above named functions with minimum changes in the conventional aircraft landing gear structure and hydraulic supply system.

The invention manifests a steering mechanism for a strut type nose landing gear particularly suited to an application where the steering angle capability is to be significant and the turning torque demanded of the system increases in conjunction with the steering angle. Three hydraulic actuators, attached through pivotal joints at either end, are mounted between the nonrotating upper telescoping member of the landing gear structure and a rotatable collar, where the collar is connected to the steerable lower telescoping member of the landing gear. When the landing gear faces forward, the lateral two actuators appear as being mounted in a conventional fashion forming moment arms with the steering collar, while the center actuator has a line of translation passing through the axis of the telescoping members and thereby contributing no steering torque.

Steering is initiated by the action of the two lateral actuators. As the steering angle increases, the center actuator rotates to form a moment arm and the lateral actuators are reoriented. Thereby, the additive steering torque available to the landing gear increases rapidly and significantly over the middle third of the steering angle on either side of a forward alignment.

DETAILED DESCRIPTION OF THE INVENTION

Figure 1:
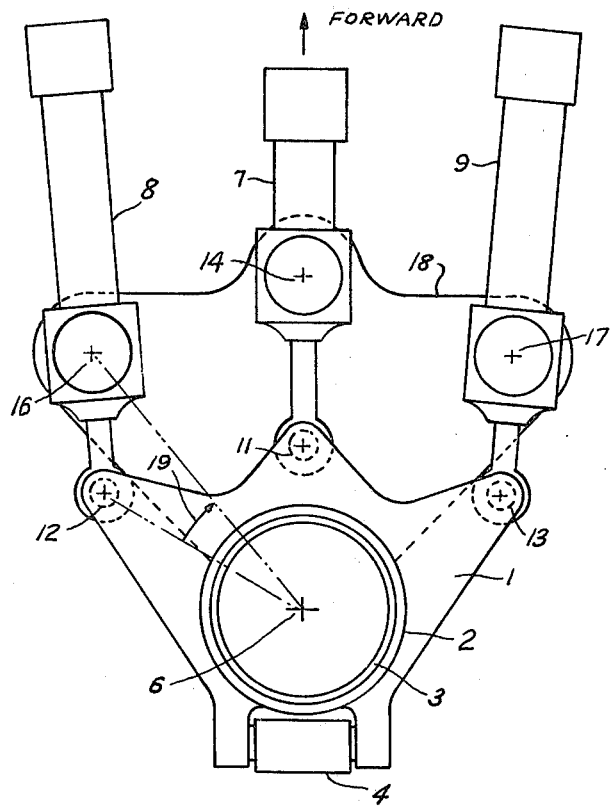
FIG. 1 is a schematic diagram showing the actuators and steering collar with the landing gear aligned in the forward direction.

Referring to the drawings, FIG. 1 discloses one embodiment of the invention showing the three actuators and their relative orientation with respect to the steering collar, when the steering is aligned in the forward direction. Steering collar 1 is journaled on upper telescoping member 2 of the landing gear. A spring mechanism and shock absorber are incorporated inside lower telescoping member 3, but since they are of a conventional design and form no part of this invention their details are omitted. Torque arms 4 of the usual configuration connect steering collar 1 to lower telescoping member 3 and form the means by which steering collar 1 rotates telescoping member 3 while allowing relative vertical motion between steering collar 1, mounted in upper telescoping member 2, and lower telescoping member 3. The translating arms of center hydraulic actuator 7, left actuator 8 and right actuator 9 are attached through pivotal pins 11, 12 and 13, respectively, to steering collar 1. The body ends of actuators 7, 8 and 9 are likewise mounted with pivotal pins to permit rotation around respective centers 14, 16 and 17 on fixed structure 18. All three actuators, 7, 8 and 9, are mounted in the same, substantially horizontal, plane parallel to the planes of steering collar 1 and nonrotating segment 18 of the landing gear structure. With the forward direction of the aircraft as shown in FIG. 1, the actuator orientation is substantially as appears in the figure.

Figure 2:
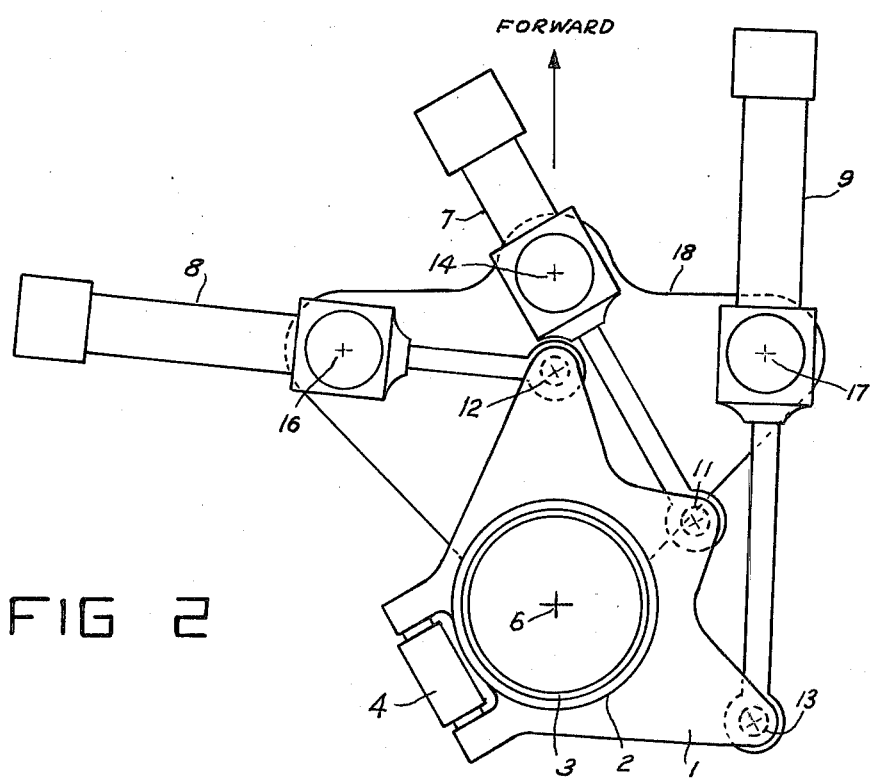
FIG. 2 is a schematic similar to that of FIG. 1 but having the actuators and collar of the steering system rotated 60 degrees to the right.

Actuators 7, 8 and 9 are of a push-pull construction with reversal from one mode to the opposite mode controlled by conventional hydraulic crossover valves acting in response to the angular orientation of the steering collar. To illustrate a typical cycle consider a rotation of the steering from the forward position, as appears in FIG. 1 and is defined to be zero degrees, to a full right orientation of 60 degrees as shown in FIG. 2. Note that pivotal centers 6, 14, 16 and 17 remain fixed relative to each other. In transversing the 60 degree right turn actuator 8 commences with a pulling action while actuators 7 and 9 begin by pushing. At the onset actuator 7 has no moment arm and contributes no torque, leaving actuators 8 and 9 to be the means by which the steering is rotated. As steering collar 1 rotates about its vertical axis 6 the moment arm associated with actuator 7 increases nonlinearly with angle. The moment arm formed by actuator 8 decreases rapidly as steering collar 1 rotates. When the rotation of the steering collar reaches angle 19, approximately 20 degrees, the moment arm formed by actuator 8 becomes zero. A crossover valve senses the angular rotation of steering collar 1 through the zero moment arm orientation and appropriately reverses actuator 8 operation to one of pushing. Thereafter, the moment arms of both actuators 7 and 8 continue to increase through the remainder of the 60 degree rotation to the right.

Actuator 9 operates in a pushing mode throughout the right turn. The moment arm formed by actuator 9 increases initially and continues to rise until it reaches a peak at approximately 30 degrees of steering collar 1 rotation. Thereafter, the moment arm, and thereby the torque, of actuator 9 decreases to a magnitude substantially equivalent to that produced with a forward orientation.

FIG. 2 shows the embodiment described above with the steering collar rotated to the right at its full extent of 60 degrees. The additive action of the three actuators and the tendency to maximize moment arms at larger steering angles is readily apparent.

Figure 3:
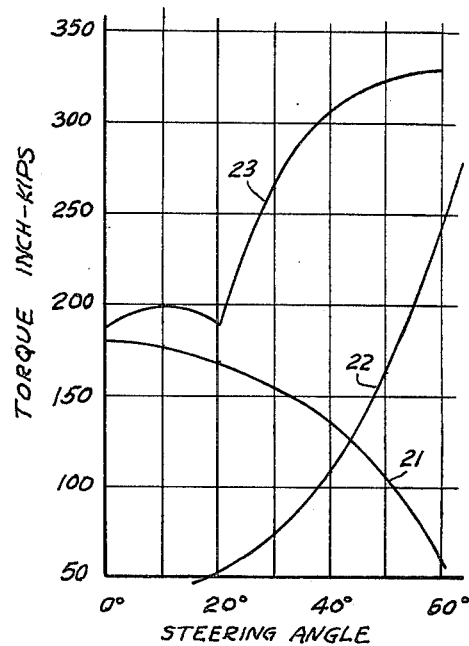
FIG. 3 contains a graphical display of torque verses angle for both the conventional and the three actuator mechanizations.

The graph in FIG. 3 displays the cumulative output from the three actuator steering mechanism, and compares the torque available from such a mechanization to that produced by a conventional two actuator system and the torque necessary to balance the steering load. Plot 21 describes the maximum output from a conventional two actuator system over the steering angle of zero to 60 degrees. The rapid drop in steering torque vividly displays such a system's deficiency when compared to plot 22 which exhibits the torque demand of the steering system. It is apparent that the load exceeds the capability before the steering angle reaches 45 degrees, 25% short of the required angular rotation.

Plot 23 in FIG. 3 shows the steering torque capability of a three actuator steering mechanism when oriented and controlled in accordance with this disclosure. The unusual shape of plot 23 discloses the interaction of the moment arms as the steering collar rotates through 60 degrees. The torque decrease appearing between 10 and 20 degrees shows the effects of the rapid reduction in the moment arm formed by actuator 8, with a simultaneous but gradual rise in the moment arm formed with the actuator 7. At approximately 20 degrees the moment arm of actuator 8 falls to zero.

The steep slope in plot 23 immediately after 20 degrees coincides with the additive increase in moment arms attributable to all three actuators. As noted above, the moment arm associated with actuator 9 reaches a maximum at a steering angle of approximately 30 degrees and decreases gradually thereafter. The cumulative effects of moment arm decreases for actuator 9 balanced against slight increases for actuators 7 and 8 cause the region of near-constant torque between 45 and 60 degrees of plot 23.

When torque output plot 23 is compared to the torque necessary to turn the landing gear used in the embodiment, plot 22, it is evident that the three actuator mechanism exceeds the demand by an adequate margin. Furthermore, the output capability of such a mechanism is disproportionately larger than the conventional two actuator configuration at increased steering angles, e.g. at 50 degrees the torque in plot 23 is three times that of plot 21.

Of course, a turn to the left exhibits analogus performance by nature of the aircraft and steering mechanism symmetry.

I claim:

1. In an aircraft nose wheel steering mechanism of the character described: a substantially vertical stationary upper telescoping member; a substantially vertical rotatable lower telescoping member coaxial with said upper member; a steering collar journaled on the upper telescoping member and rotatable thereabouts; a means for transmitting torque between said steering collar and said lower telescoping member; three substantially identical push-pull actuators capable of producing translational forces in the plane of the steering collar; six joints lying to one side of a plane which passes through the axis formed by the telescoping members and are capable of rotation about a substantially vertical axis, said joints attaching the opposite ends of said three actuators between said steering collar and said stationary upper telescoping member; and having said actuators oriented whereby a forward alignment of the steering mechanism orients the translational axis of the first actuator to pass through the rotational axis of said steering collar while the second and third actuators form opposite moment arms about said steering collar rotational axis, and where, rotation of said steering collar in a first direction from the forward alignment causes the moment arm of said second actuator to decrease, pass through zero, and increase thereafter in an opposite direction while the moment arm formed by said third actuator remains unchanged in direction but varies in magnitude, and rotation in a second direction, opposite that of the first, interchanges the operations of said second and third actuators.

2. The steering mechanism of claim 1 in which said three actuators are symmetrically disposed in an orientation where said second and third actuators are substantially in parallel with said first actuator when the steering is aligned to be in the forward direction.

3. The steering mechanism of claim 2 in which said steering collar has an angular limit of approximately 60 degrees either side of said forward direction, and said rotatable joints attach the ends of said three actuators such that the lateral actuator whose moment arm is decreasing, as the collar rotates from the forward orientation, reaches zero moment arm at about 20 degrees of collar rotation, the moment arm of the other lateral actuator reaches a maximum value at about 30 degrees of collar rotation, and said center actuator forms maximum moment arms when said steering collar approaches its angular limits.

4. An aircraft nose wheel steering mechanism comprising: fixed upper and rotatable lower telescoping members coaxial to a steering axis; a steering collar journaled on said fixed upper member concentrically with said steering axis; means for transmitting torque between said collar and the lower telescoping member; a fixed structure attached to said upper telescoping member; a pair of linear actuators pivotally anchored at separate points on said fixed structure and pivotally attached at separate points on said collar, the anchor points on said fixed structure being equidistant from said steering axis and having a predetermined angular spacing about the steering axis, and the attachment points on said collar being equidistant from the steering axis and closer thereto than said anchor points and having an angular spacing about the steering axis greater than the spacing of said anchor points, the center position of said steering mechanism being that at which the bisector of the anchor point spacing angle and the bisector of the collar attachment point spacing angle coincide; and a third linear actuator pivotally anchored on said fixed structure at a point on the bisector of said anchor point spacing angle at the same distance from the steering axis as the other anchor points, and pivotally attached to said steering collar at a point on the bisector of said collar attachment point spacing angle at less distance from the steering axis than the other attachment points.

* * * * *